Patented Oct. 1, 1940

2,216,174

UNITED STATES PATENT OFFICE 2,216,174

PROCESS FOR PREPARATION OF CAROTIN DECOLORIZING MATERIAL

John D. Guthrie, Yonkers, N. Y., assignor to Standard Brands Incorporated, New York, N. Y., a corporation of Delaware No Drawing. Application August 24, 1939, Serial No. 291,674

5 Claims. (Cl. 99—232)

The invention relates to a process for the preparation of a product having marked bleaching action upon carotin coloring matter. More particularly, it is concerned with the production of a concentrated carotin bleaching material obtained from legumes, a process for its preparation from soy beans, and the like, and a procedure for its utilization in the manufacture of baked goods, and includes correlated improvements and discoveries whereby the decolorization of carotin is enhanced.

An object of the invention is to provide a material having distinctive potency for the bleaching or decolorization of carotin coloring matter.

A further object of the invention is the provision of a carotin decolorizing material having a potency several times that of a legume flour, for example, soy bean flour.

Another object of the invention is to provide a carotin decolorizing material which may be used efficaciously for the manufacture of baked goods, especially bread, having an improved interior color or whiter crumb.

An additional object of the invention is to provide a process for the preparation of a carotin decolorizing material of high activity from legumes, which may be carried out effectively, economically and readily under commercial production.

A more specific object of the invention is the provision of a procedure for the manufacture of baked goods of improved interior color, which entails utilization of a concentrated carotin decolorizing material.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of the invention will be indicated in the claims.

In the practice of the invention a concentrated carotin decolorizing material may be prepared by the extraction of a legume, for example, soy bean, black-eyed cow peas, lupine seeds, and the like, preferably in the form of a flour, by a treatment initially of the legume flour with a solvent, particularly an aqueous solvent, and specifically water. If it is desired to reduce the amount of dry matter contained in the extract the solvent may be acidulated. Thus, there may be utilized a dilute solution of an inorganic acid, such as hydrochloric, sulfuric, phosphoric. Moreover, the amount of acid added may be such as will give a pH value to the extract which lies between 5.2 and 5.9.

The advantage of the use of an acidulated solvent is two-fold inasmuch as the amount of active material extracted is equal to that extracted by water alone, but only about one-half as much dry matter is extracted. This, of course, accomplishes also a purification of the active material, and the extract, because of a lower dry matter content, will possess a raw bean flavor to a considerably lesser amount. Satisfactory results have been obtained when the amount of acid used is such as to yield an extract having a pH value of 5.5.

The extract thus obtained may then be brought to a pH value of 6.5 to 7 through the addition of a dilute alkali such as sodium hydroxide, potassium hydroxide, the corresponding carbonates and the like, and thereupon a precipitation is effected through the addition to the solution of an organic liquid, as acetone. The solution is now permitted to stand for several hours, e. g., overnight in a refrigerator, and a precipitate of active carotin decolorizing material is obtained and separated from the liquid by filtration, which may be assisted by using suction. There results a rather friable precipitate which is dissolved in water and the solution dialyzed in running water through a collodion membrane; the active material being retained within. Following dialysis the solution is evaporated to dryness, desirably under vacuum, and at a temperature of 40° C. or less. Thereby a brittle crystalline-like substance is obtained having a carotin decolorizing activity, which is about five times that of the same weight of soy bean flour. The active material consequently is about five times as potent as the soy bean flour.

As illustrative of a manner in which the carotin decolorizing material may be produced, the following example is presented:

An extract of soy flour may be prepared by grinding with water in a mortar in the proportion of about 100 cc. of water for each 10 grams of soy bean flour. This mixture is centrifuged, the fatty layer which separates removed by skimming, and the middle aqueous layer withdrawn by decantation. To this aqueous layer there is added an organic liquid as a precipitant, specifically acetone, in an amount which is about four times the volume of the aqueous layer. A precipitate forms and after it has settled it may be removed by filtration through a hardened filter paper in a Büchner funnel using suction. A pure product may be obtained through a washing of the precipitate with acetone, following which it may be dried in a vacuum dessicator over sulfuric acid. The yield is about 4.2 grams for each 100 cc. of extract, and the material is characterized by a potency several times that of the soy bean flour from which it was prepared.

The water with which the soy flour is ground may be acidulated to a pH value of 5.2 to 5.9, for example, through addition of hydrochloric acid. Further, N/10 sodium hydroxide may be added to the aqueous layer, following separation from solid material, so as to adjust the pH value to 6.5 to 7.0. It has been found that in addition to the soy bean and black-eyed cow peas other legumes may be used, and mention may particularly be made of the following: *Dolichos lablab* seeds, *Plaseolus metcalfei* seeds, *Vicia faba* seeds, lupine seeds, Mexican beans, regina beans, lima beans, Caneli beans, peas, lentils, pea beans.

The foregoing procedure leads to the preparation of an active and highly potent agent whereby carotin coloring matter may be decolorized. These preparations may be from five to twelve times as active as the same weight of soy flour, and consequently possess the marked advantage that the same amount of bleaching or decolorizing of carotin coloring matter may be effected with less material, and hence with less danger of imparting an undesirable color and/or taste to the finished product. Thus, a concentrated material having five times the potency of soy bean flour could be added to a dough batch in an amount which is only one-fifth of that which would be required if soy bean flour were employed. Accordingly, in the event that from 0.3 to ½% of soy bean flour were being used in the preparation of a dough batch, there would be required only one-fifth of this amount when using the concentrated material prepared from soy bean flour in accordance with the method set forth herein. Moreover, the concentrated material retains its activity for a considerable period of time under the usual temperature and pressure conditions, and its activity may be retained indefinitely when stored in vacuo, or maintained at a temperature of about −7° C.

The invention is attended by the following features: a legume flour, as soy bean, contains two components which enter into the decolorization of carotin coloring matter, a component A which is destroyed by boiling, and a component B which is not destroyed by boiling and has the properties of an activator; neither component passes a collodion membrane; component A is present in the seeds of many and various legumes, and component B, in addition to its presence in legumes, is found also in vegetable lecithin, egg lecithin, vegetable oils, an ether extract of wheat flour, and in grain beetles; the effect of the active material in produced through the conjoint action of oxygen; and, such effect is not inhibited by the presence of extraneous materials, as cyanides.

Production of an improved interior color in bread requires only the introduction of component A inasmuch as it appears that component B is present in solution in the oil or fat of the flour. The manufacture of baker goods is carried out by introducing the concentrated material into a dough batch, and subsequently shaping and baking. If the dough batch does not contain any, or an insufficient amount of, component B, it likewise is added thereto. In the production of bread the concentrated material is incorporated into a dough batch containing flour, water, yeast, and other dough ingredients, forming the batch into a dough, and subsequently baking. When the yellow pigments of wheat flour were extracted by means of ether, and treated with component A, they were completely decolorized without the addition of component B, thereby evidencing the presence of the B component in the oil extracted by the ether. An active material containing component A and being at least five times as potent as soy bean flour may be prepared from the soy bean by the methods herein given, and a similar product produced from the cow pea possessed an activity about twelve times that of soy flour.

Since certain changes in carrying out the above process and certain modifications in the product which embody the invention may be made without departing from its scope, it is intended that all matter contained in the above description shall be interpreted as illustrative and not in a limiting sense.

This application is a continuation-in-part of my copending application Serial No. 150,537, filed June 26, 1937.

Having described my invention, what I claim as new and desire to secure by Letters Patent is:

1. A process for the preparation of a concentrated carotin decolorizing material, which comprises treating a legume with an aqueous solvent, separating solid and liquid, adding acetone to said liquid whereby a precipitate of active material is obtained, separating active material so produced from liquid, and drying at a low temperature.

2. A process for the preparation of a concentrated carotin decolorizing material, which comprises treating a legume with acidulated water, separating solid and liquid, the amount of acid in the water being sufficient to give a separated liquid having a pH value of 5.2 to 5.9, adding acetone to the liquid whereby a precipitate is obtained, separating precipitate thus produced from liquid, and drying at a low temperature.

3. A process for the preparation of a concentrated carotin decolorizing material, which comprises treating soy bean flour with water acidulated with hydrochloric acid, separating solid and liquid, the amount of hydrochloric acid being sufficient to give to the separated liquid a pH value of about 5.5, adding sodium hydroxide thereto until a pH of 6.5 to 7.0 is obtained, then adding acetone whereby a precipitate is obtained, separating precipitate from liquid, dissolving separated precipitate in water, dialyzing against running water, and evaporating at a temperature less than 40° C.

4. A process for the manufacture of baked goods, which comprises incorporating with a dough batch containing flour, yeast, water and other dough ingredients, a concentrated carotin decolorizing material in the form of a crystalline-like product and prepared by treating an aqueous extract of a legume with acetone whereby a precipitate of active material is obtained, separating active material from liquid, and drying at a low temperature, forming the mass into a dough, and subsequently baking.

5. A process for decolorizing carotin coloring matter, which comprises treating carotin coloring matter with an active concentrated material in the form of a crystalline-like product having a potency substantially greater than an equal amount of soy bean flour and prepared by treating a legume with an aqueous solvent, separating solid from liquid, adding acetone to said liquid whereby a precipitate of active material is obtained, separating the precipitate so produced, and drying at a temperature upwards to 40° C.

JOHN D. GUTHRIE.